Dec. 29, 1964  L. M. LITZ ETAL  3,163,590
HYDROGENATION OF GROUPS III, IV AND V ELEMENTS
Filed April 27, 1961  5 Sheets-Sheet 1

INVENTORS
LAWRENCE M. LITZ
STANLEY A. RING
BY
ATTORNEY

Dec. 29, 1964  L. M. LITZ ETAL  3,163,590
HYDROGENATION OF GROUPS III, IV AND V ELEMENTS
Filed April 27, 1961  5 Sheets-Sheet 2

INVENTORS
LAWRENCE M. LITZ
STANLEY A. RING
BY
ATTORNEY

Dec. 29, 1964 L. M. LITZ ETAL 3,163,590
HYDROGENATION OF GROUPS III, IV AND V ELEMENTS
Filed April 27, 1961 5 Sheets-Sheet 3

INVENTORS
LAWRENCE M. LITZ
STANLEY A. RING
BY John F. Hohmann
ATTORNEY

Dec. 29, 1964   L. M. LITZ ETAL   3,163,590
HYDROGENATION OF GROUPS III, IV AND V ELEMENTS
Filed April 27, 1961   5 Sheets-Sheet 4

INVENTORS-
LAWRENCE M. LITZ
STANLEY A. RING
BY
ATTORNEY

Dec. 29, 1964 L. M. LITZ ETAL 3,163,590
HYDROGENATION OF GROUPS III, IV AND V ELEMENTS
Filed April 27, 1961 5 Sheets-Sheet 5

INVENTORS
LAWRENCE M. LITZ
STANLEY A. RING
BY John F. Hohmann
ATTORNEY

United States Patent Office 3,163,590
Patented Dec. 29, 1964

3,163,590
HYDROGENATION OF GROUPS III, IV AND V ELEMENTS
Lawrence M. Litz, Lakewood, and Stanley A. Ring, Cleveland, Ohio, assignors to Union Carbide Corporation, a corporation of New York
Filed Apr. 27, 1961, Ser. No. 105,925
12 Claims. (Cl. 204—61)

This invention relates to the production of hydrogenated compounds of those elements of Groups III, IV and V of the Periodic Table of the Elements which form hydrides. More particularly, the invention relates to the production of such compounds from halogen-containing compounds of the selected elements. Although the invention thus lends itself to the production of a great number of compounds, for conciseness it will be described with particular reference to the production of such compounds as silane and diborane as specific examples of its practice.

Such compounds are gaining in commercial interest for a number of reasons. For example, silane is a good starting material for the production of silicon of transistor grade. Because of this commercial interest, there is a demand for a process for the production of such compounds which lends itself to commercial operation on a large scale.

It is therefore an important object of the invention to satisfy this demand. A more general object of the invention is the provision of an improved process and apparatus for producing hydrogenated compounds of those elements of Groups III, IV and V which form stable hydrides. A specific object is provision of a process and apparatus for the continuous-cyclic production of silane and diborane.

The invention by means of which the foregoing objects are attained comprises a process including electrolysis, hydriding and hydrogenating steps.

Preferably each step is conducted in a separate zone wherein the optimum temperature for the desired reaction may be maintained. A characteristic of the invention is that the product of each of the intermediate steps is physically transported from one zone to another and that each step is conducted in the presence of a non-oxidizing melt containing a halide of a selected alkali or alkaline earth metal, which melt is physically circulated from one zone to another.

Thus, in accordance with the invention a melt of the type described is electrolyzed in an electrolysis zone under conditions such that the selected alkali or alkaline earth metal is produced electrolytically. The metal so produced is hydrided by reaction with hydrogen while in contact with the melt. The hydride thus produced is soluble in and dissolves in the melt. The hydride in solution in the melt is then reacted with a halogen-containing compound of the chosen Groups III, IV or V element in a hydrogenating zone to form the desired hydrogen-containing compound, which is recovered. As a by-product of this reaction, halide of the selected alkali or alkaline earth metal is produced. The halide so produced is dissolved in the melt. The alkali or alkaline earth metal halide-rich melt is then recirculated to the electrolysis zone, or, as will be described below in detail, may be electrolyzed in situ and the circulation reversed.

Exemplary of the invention, the production of silane in accordance with its principles may be considered. For the production of silane a convenient melt is composed of a lithium chloride-potassium chloride eutectic mixture, that is, a mixture containing about 45% lithium chloride and 55% potasisum chloride. This melt is electrolyzed at a temperature above the freezing point of the melt and preferably in the range 400° C. to 500° C., producing lithium metal and chlorine gas.

The lithium produced by electrolysis is reacted with hydrogen, in accordance with the invention, preferably in a zone separate from the electrolysis zone, but in contact with the lithium chloride-potassium chloride melt. Under reaction conditions of temperatures in excess of 450° C. and preferably in the range 550° C. to 625° C., lithium hydride is produced and dissolved in the melt. The reaction is believed to be:

(1) 
$$Li + \tfrac{1}{2} H_2 \rightarrow LiH$$

At temperatures much below 450° C. the reaction proceeds quite slowly, if at all, while at temperatures much above about 625° C. the melt tends to volatilize to an undesirable degree, and if the temperature exceeds about 800° C. the hydride produced may decompose. The freezing point of the lithium hydride-lithium chloride-potassium chloride ternary solution may be somewhat below the freezing point of the binary melt depending upon the concentration of hydride in solution.

The lithium hydride solution produced as just described is transported to a separate zone or chamber into which is also fed silicon tetrachloride. The solution is maintained at a temperature above its freezing point and below about 500° C. or the temperature at which the decomposition of the desired product is too rapid. A preferred temperature range for the production of silane is about 390° C. to 430° C. The reaction which takes place is believed to be:

(2) 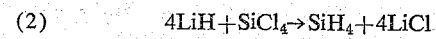
$$4LiH + SiCl_4 \rightarrow SiH_4 + 4LiCl$$

The silane ($SiH_4$) produced is gaseous and is continuously removed. The lithium chloride produced is retained in, and enriches, the melt. The lithium chloride-enriched melt may then be recirculated to the electrolysis zone and electrolyzed to re-initiate the sequence just described.

It will be noted that in the process just described three basic steps are performed and that each step is performed at a different temperature which is the optimum for the particular step. In order to accomplish this, it is essential that materials be transported from one reaction zone or chamber to another. In accordance with the invention, the melt is contained in each zone and is also used as a transport medium in apparatus especially suited to the practice of this concept.

The invention accordingly comprises apparatus especially suited to the practice of the process. Generally, the apparatus of the invention comprises an electrolysis cell suitable for the electrolysis of a molten salt bath, a hydriding chamber, and a hydrogenating chamber. Suitable passages between the chambers are provided for transport and recirculation of reaction products and molten salt.

In the discussion of the apparatus now to follow, for conciseness, particular reference will be made to the operation of the apparatus for the production of silane, but it will be understood that the apparatus is entirely suitable for use in the production of other compounds.

Figure 1:
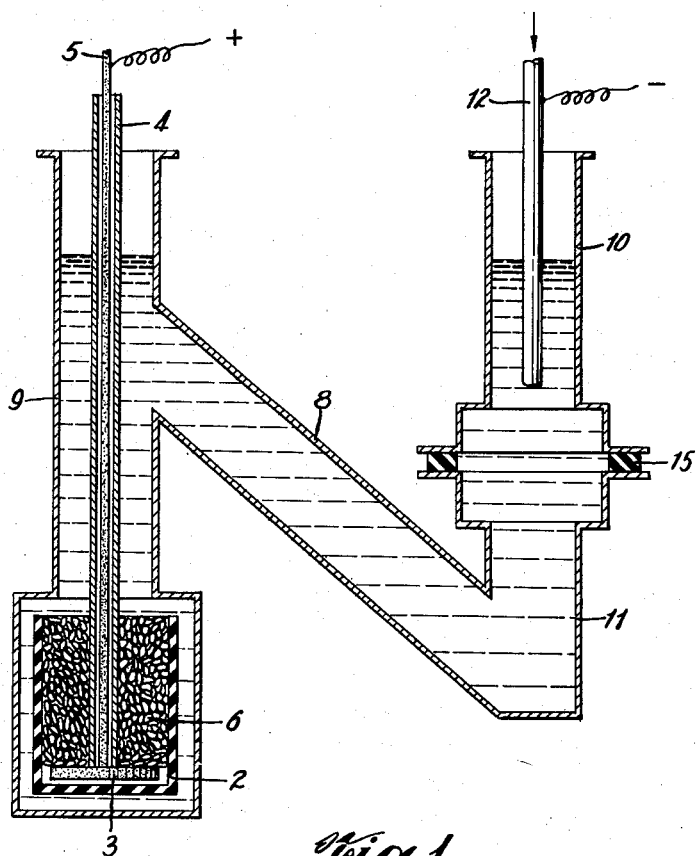
FIG. 1 is a vertical section of one form of apparatus embodying the invention in which electrodes of the electroylsis cell are in separate chambers.

Referring now to the drawings, in FIG. 1 is depicted in vertical section a generally N-shaped apparatus in each leg of which is provided an electrode. Thus, at the bottom of one leg 9 of the apparatus is a vessel 2 composed of electrically insulating material. At the bottom of the vessel 2 is an anode contacting plate 3, suitably of graphite, and a lead 5, insulated by a sleeve 4 which makes electrical contact with the plate 3 and extends upwardly through the leg 9 and out the top thereof. The vessel 2 is filled with lumps 6 of silicon which thus rest upon the contact plate 3 and constitute the anode.

The other leg of the apparatus of FIG. 1 is composed generally of two sections, an upper section 10 and a lower section 11, each of which has in meeting portions an area of greater diameter than the remainder of the leg sections. The upper and lower sections 10, 11 are joined, with a gasket 15 of electrically insulating material provided in the joint. Extending into the upper section 10 is a hollow metal tube 12 which is made the cathode of the system. The two legs of the N-shaped apparatus are joined by a sloping pipe or passage 8 extending from the lower section 11 of one leg to the upper portion of the other leg 9. The entire apparatus may be provided with separately controllable conventional external heating elements not shown.

In operating the apparatus of FIG. 1 for the production of silane, the apparatus is filled with a molten bath, preferably of lithium chloride-postassium chloride eutectic. The bath is electrolyzed, producing lithium at the cathode 12. Hydrogen is blown into the section 10 through the metal tube cathode 12, and the electrolytically-produced lithium reacts with the hydrogen to form lithium hydride. The hydride dissolves in the melt, and the resulting solution containing lithium hydride is transported through the enlarged portion of the upper section 10 to the lower section 11 by the bubbling action of the melt caused by the introduction of hydrogen thereto.

At the anode, meanwhile, silicon tetrachloride is produced in gaseous form. This gaseous compound rises from the anode vessel 2 into the upper portion of the leg 9 which is maintained at a lower temperature than the lower section 11 of the other leg. In the area where the passage 8 and the leg 9 are joined, lithium hydride, which has been transported in solution from the lower section 11 through the passage 8, reacts with the silicon tetrachloride to produce silane ($SIH_4$), which is removed as a gas from the top of the leg 9, and molten lithium chloride which dissolves in the melt. The lithium chloride melt solution flows downwardly in the passage 8 to the lower section 11 of the other leg of the apparatus, thus replenishing the bath there. It will be seen, accordingly that there is a circulatory loop in the passage 8 of lithium hydride-melt solution and lithium chloride-rich melt, circulation being attributable, at least in part to the temperature differential existing beween the sections 9 and 11, section 9 being the colder.

Figure 2:
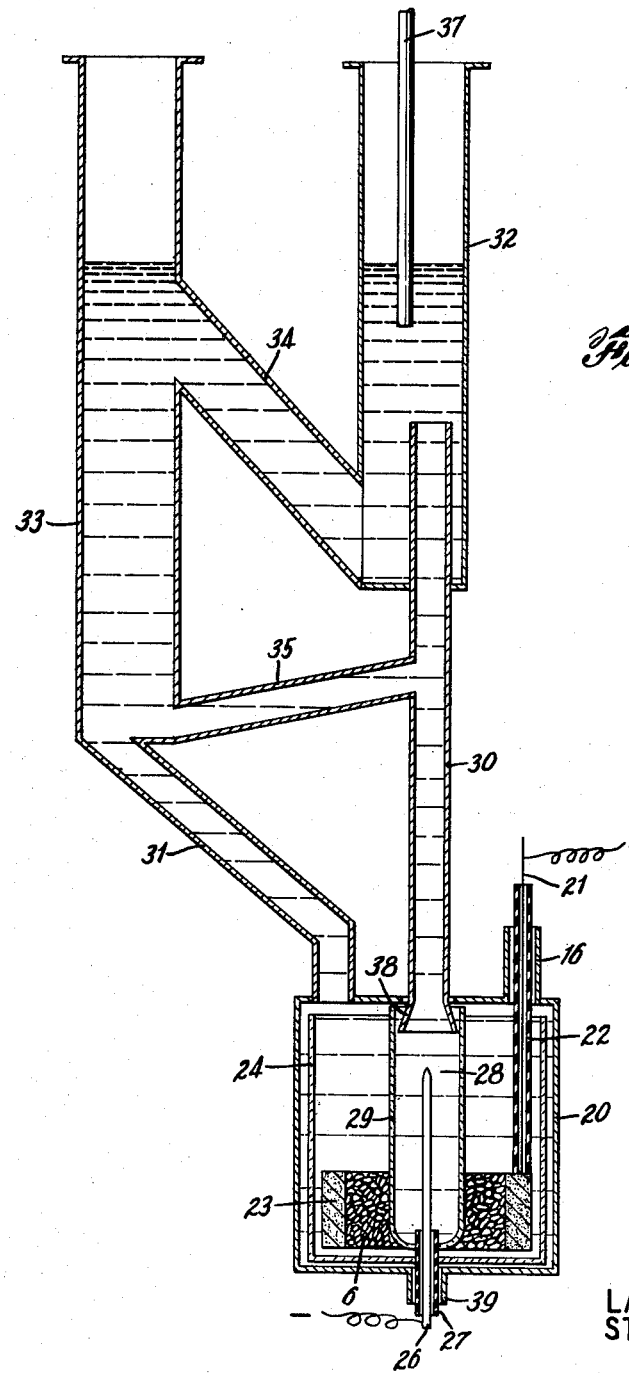
FIG. 2 is a vertical section of a modified form of apparatus having a different arrangement of electrolysis cell and melt-circulating loops.

The embodiment of the invention illustrated in FIG. 2 differs from that of FIG. 1 in a number of respects, primarily in that the electrodes, although closely spaced, rather than widely separated as in the apparatus of FIG. 1, are in separate anode and cathode compartments, both of which are separated from the hydriding and hydrogenation zones. An advantage of this type of electrode placement over the separated electrodes is that higher currents may be obtained for a given D.C. voltage and/or size of apparatus.

The apparatus of FIG. 2 comprises a closed, heat-resistant container 20. Fitting in the container is an insulated, open-top vessel 24 defining an anode chamber which, as shown, contains silicon 6 which is the anode. Both the container 20 and the vessel 24 have a central bottom opening through which passes an insulated cathode lead-in sleeve 27, which, at its upper part, extends into the vessel 24. At its lower extremity, the sleeve 27 extends slightly beyond and below a sleeve section 39 of the container 20, to which it is sealed. The cathode 26 passes through the sleeve 27 and extends approximately two-thirds of the way into a cathode chamber 28 defined within the container 20 by an electrically insulating diaphragm 29 suitably composed of a ceramic material.

A graphite anode contact ring 23 surrounds the cathode chamber 28 and is connected on one side to the anode lead-in insulating sleeve 22. An anode lead-in 21 passes through the sleeve 22 and makes electrical contact with the ring 23. The sleeve 22 extends through the container 20 and outwardly through an upper sleeve 16. The container 20 has a central upper opening through which passes a pipe 30 having an enlarged lower extremity 38 which extends into the cathode chamber 28 and serves as a lithium collector hood. The upper extremity of the pipe 30 extends into a hydriding chamber 32 which constitutes one leg of a generally N-shaped apparatus, the other leg of which comprises a hydrogenating chamber 33 which in turn is connected to the container 20 by an upwardly sloping pipe 31. A connecting pipe 35 links the pipe 30 and the lower portion of the chamber 33 near the pipe 31. A sloping pipe 34 connects the upper part of the hydrogenating chamber 33 with the lower part of the hydriding chamber 32. A hydrogen inlet tube 37 extends into the chamber 32. Conventional heaters not shown are provided for the chambers 32 and 33 for individual temperature control. Normally, with the arrangement shown, the chamber 32 is maintained thereby at a higher temperature than is the chamber 33.

In operating the apparatus of FIG. 2, it is filled with melt to a level above the intersection of the sloping pipe 34 and the hydrogenating chamber 33 and such that the tube 37 is immersed in it. Upon electrolysis, lithium metal is produced at the cathode 26 and rises in the pipe 30 into the hydriding chamber 32 where it is converted to the hydride by reaction with hydrogen bubbled into this chamber through the tube 37. Silicon tetrachloride ($SiCl_4$) is produced at the silicon anode in the chamber 24 and rises as gaseous bubbles up the pipe 31 into the hydrogenating chamber 33. Due to the temperature difference existing between the hydriding chamber (relatively high temperature) and the hydrogenating chamber (relatively low temperature), the salt is caused to circulate by thermal convection around the loop from the hydriding chamber 32, up the pipe 34, down through the hydrogenating chamber 33 and back to the hydriding chamber 32 through the pipe 35. The hydride-rich salt descending in the halogenating chamber 33 contacts the rising $SiCl_4$ and converts it to silane.

Figure 3:
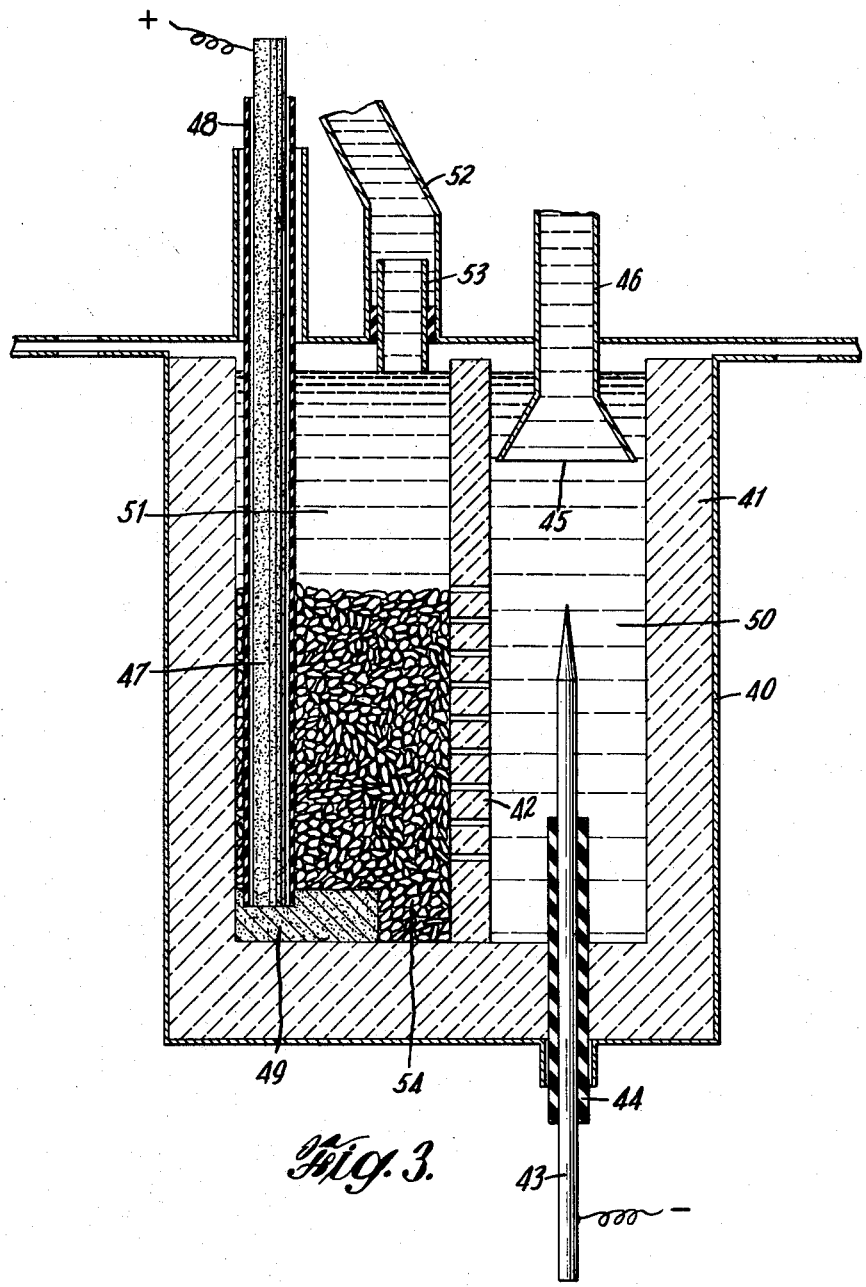
FIG. 3 is a vertical section on a larger scale of an electroylsis cell similar to that of FIG. 2, but showing a different electrode arrangement.

The apparatus illustrated in FIG. 3 is a modification of that of FIG. 2 in which the electrolysis cell design has been altered, the superstructure remaining the same. As shown in FIG. 3, the cell thereof comprises a heat-resistant container 40. Fitting in said container is an electrically insulating cell wall liner 41 suitably composed of ceramic material. Within the area defined by the liner 41 are an anode compartment 51 and a cathode compartment 50 separated by a diaphragm 42 composed of electrically insulating material. Lumps of silicon 54 are contained in the anode compartment and constitute the anode. A cathode lead-in insulating sleeve 44 passes through a flanged opening in the bottom of the container 40 and extends into the cathode compartment 50. A cathode 43 passes through the sleeve 44 and extends about halfway up into the cathode compartment 50. A pipe 46 leading to the hydriding chamber (not shown) has a collector hood 45 extending well into the cathode chamber 50. An electrically insulated pipe 53 extends from the top of the anode chamber 51 into a riser pipe 52 which latter connects the anode compartment 51 with the hydrogenating chamber (not shown). The pipe 53 provides for entry into the riser pipe 52 of melt with which the apparatus is filled in use, and, at its lower extremity defines the melt level in the anode compartment 51. Thereby the pipe 53 causes a sealed gas space to be created at the top of the cell which serves as an insulator between the molten salt and lid of the cell. An anode lead-in insulating sleeve 48 passes through the top of the cell container 40 through a flange therein and contacts an anode contact plate 49 as does an anode lead-in 47 fitting therein.

Figure 4:
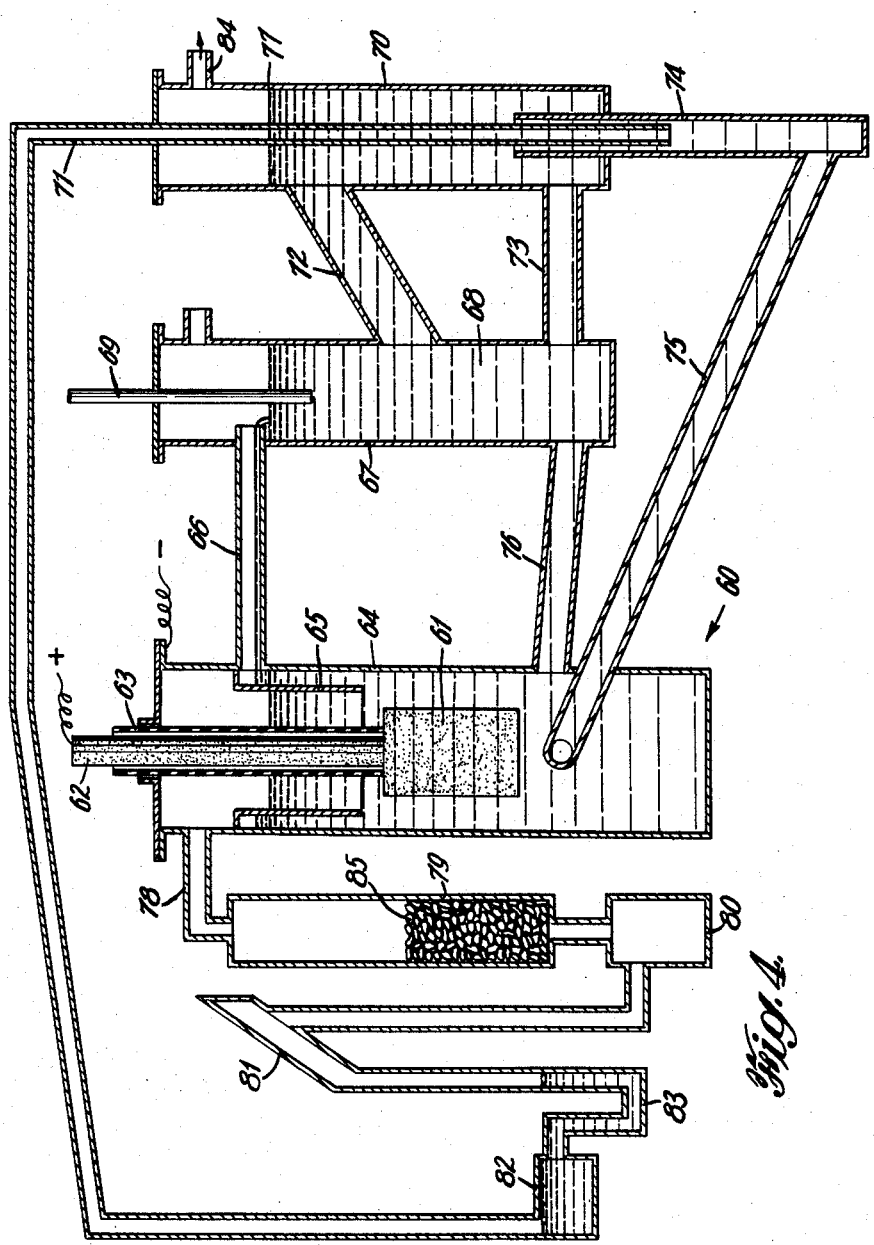
FIG. 4 is a vertical section of a modified form of apparatus having separate electrolysis, hydriding, and hydrogenating chambers and associated passages therebetween.

FIG. 4 represents an apparatus incorporating closely spaced electrodes in a cell compartment which is disposed to the side of the high and low temperature chambers (instead of underneath as is the case in FIGS. 2 and 3). In addition, this apparatus utilizes a silicon tetrachloride generator external to the cell as shown somewhat schematically.

As shown in FIG. 4, the unit comprises an electrolytic cell 60 containing a graphite anode 61 passing through an anode insulating sleeve 63 located on top of the cell 60. An anode lead-in 62 contacts the anode 61 as shown. The electrolysis cell wall 64 serves as the cell cathode. A collector 65 for metal produced during electrolysis is positioned in the upper part of the cell 60 and depends from slightly above the entrance to a transfer pipe 66. The pipe 66 leads to a hydriding chamber 67 containing, during operation, hydride-rich melt 68. A tube 69 fits through an opening in the top of the chamber 67 and extends into the melt. A pipe 76 links the bottom of the chamber 67 with the electrolysis cell 60 to permit melt to flow out of the cell 60 into the chamber 67. Upper and lower cross legs 72, 73 link the hydriding chamber 67 with a hydrogenating chamber 70 to allow circulation of salt between the two caused by the temperature difference between the two chambers during operation. An outlet 84 for removal of product is provided on the hydrogenating chamber 70. The hydrogenating chamber 70 is adapted to hold melt up to a level above the entrance to the cross leg 72, for example as indicated at 77. As shown, the hydrogenating chamber 70 has a narrow bottom section 74 to permit good scavenging of hydride. This bottom section 74 communicates with the bottom of the electrolysis cell 60 by means of a return pipe 75. A tube 71 for supplying the halogen containing substance to be hydrogenated to the chamber 70 passes through its top and terminates in the narrow bottom portion 74 thereof. The tube 71 is connected to a generator 79 through associated apparatus including a conventional trap 80 connected to the generator 79, a condenser 81, a liquid seal 83 and an evaporator 82. A conduit 78 connects the generator 79 with the electrolysis cell 60 at a point above the collector 65.

In operation of the apparatus of FIG. 4 for the production of silane the electrolysis cell 60, hydriding chamber 67 and hydrogenating chamber 70 may be filled with lithium chloride-potassium chloride melt. Upon electrolysis under the conditions herein defined, molten lithium is produced and floats upon the melt in the annular space defined by the collector 65 and the interior walls of the chamber 64. When the level of molten metal reaches that of the pipe 66, the molten metal passes into that pipe and through it into the hydriding chamber 67. Here it is reacted under defined conditions with hydrogen introduced through the tube 69 to produce lithium hydride which dissolves in the melt. The solution of hydride in melt then passes through the pipe 72 into the hydrogenating chamber 70 (which is at a lower temperature than is the hydriding chamber 67) into the bottom section 74 to which is introduced gaseous silicon tetrachloride through the tube 71. Under controlled conditions of temperature, reaction takes place to produce silane, which is removed through the outlet 84, and lithium chloride which enriches and is retained in the melt. The lithium chloride-rich melt is recirculated to the electrolysis cell 60 through the pipe 75.

At the anode 61, chlorine gas is formed during electrolysis and this gas is passed through the pipe 78 to the generator 79 which contains elemental silicon preferably in lump form 85. The silicon and chlorine react to produce gaseous silicon tetrachloride which is purified by passage through the trap 80 and is condensed to liquid form in the condenser 81. The liquid is collected in the liquid seal 83 and is evaporated to gaseous form in the evaporator 82 upon demand to provide gas through the tube 71 for the hydrogenating chamber 70.

It will be noted that in the apparatus just described, melt circulates between the electrolysis cell 60, the hydriding chamber 67 and the hydrogenating chamber 70 through the pipes or passages 76, 72, 74 and 75 connecting the vessels in which the desired reactions take place. This circulation as indicated above is conveniently attained by thermal convection.

Figure 7:
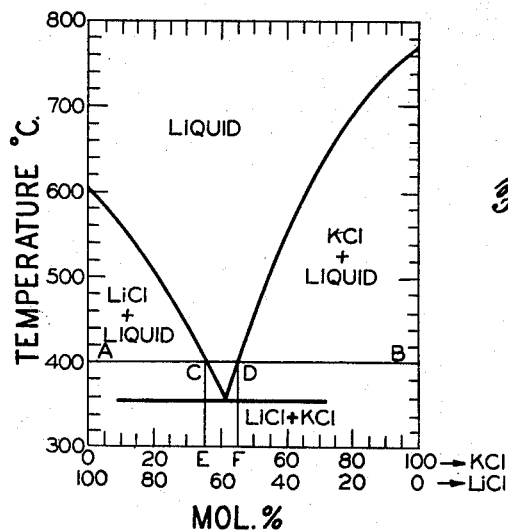
FIG. 7 is an equilibrium diagram of the system lithium chloride-potassium chloride.

Again with reference to the preparation of silane as a specific example of the practice of the invention, it should be observed that the lithium chloride which is formed as the by-product of the reaction between silicon tetrachloride and the lithium hydride dissolved in the lithium chloride-potassium chloride melt, is recycled to the electrolysis cell by a salt loop in each form of apparatus so far discussed. The loop in question refers to the circulation of the formed lithium chloride from the hydrogenating chamber to the electrolysis cell. The indicated circulation or salt loop is necessary to prevent the accumulation of lithium chloride beyond the concentration at which the freezing point of the melt would become excessive for normal operation. As has been stated, it is important to maintain the temperature of the hydrogenating chamber at about 390° C. to 430° C. Silane dissociates to an undesirably high degree at temperatures much above this range, thereby reducing the yield. To operate at 400° C., the freezing point of the melt obviously must be below this temperature. Thus, referring to the phase diagram of FIG. 7, it will be noted that line AB, drawn at the 400° C. temperature level, intersects the liquidus of the system at points C and D. These points correspond to compositions in the lithium chloride-potassium chloride system shown as E and F and define the range of compositions of this melt system which are preferred. The presence of hydride in solution in the melt will affect to some extent the particular compositions which are determining but will not cause a departure from the underlying principle.

Figure 5:
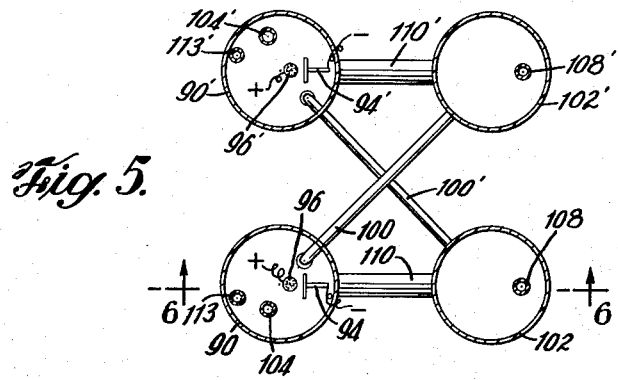
FIG. 5 is a plan view of yet another modification of apparatus embodying the invention especially suited to a continuous-cyclic process to be described.
Figure 6:
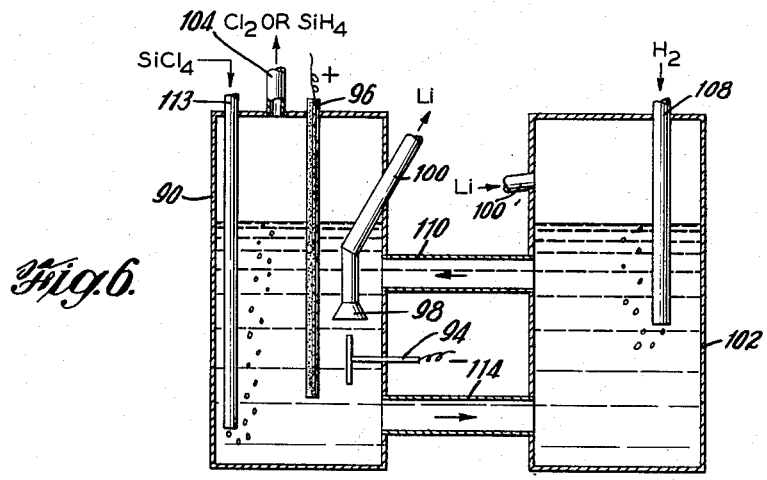
FIG. 6 is a vertical section (on a different scale) of the apparatus of FIG. 5 taken on the line 6—6 looking in the direction of the arrows.

In another variant of the present invention, process and apparatus are provided wherein the salt composition will vary between the above-noted composition points E and F. Apparatus for this embodiment of the invention is shown in FIGS. 5 and 6. This apparatus comprises two identical pairs of reactors comprising vessels 90, 90', 102 and 102', one pair of which (90 and 102) is shown in vertical elevation in FIG. 6. In each of the vessels 90, 90' are provided anodes 96, 96' and cathodes 94, 94', respectively. Also in each vessel 90, 90' are provided an inlet pipe 113, 113' extending within the vessel 90, 90' and an outlet vent 104, 104'. Running from the first reactor vessel 90 to the diagonally-placed opposite vessel 102' is a conduit 100 and from the vessel 90' a similar conduit 100' runs to the vessel 102 which is diagonally opposite it. The conduit 100 and the conduit 100' are both provided with a collector hood, only one of which, 98, is shown in FIG. 6, which hood is placed about midway of the depth of the reactor 90. Connecting each pair 90, 102 and 90', 102' are pairs of upper and lower interconnecting pipes, only three of which, 110 and 114 (FIG. 6), and 110' (FIG. 5), are shown. In each of two vessels 102, 102' there is provided a hollow tube 108, 108' which extends into the vessel below the upper interconnecting pipe 110, 110'.

The operation of the apparatus of FIGS. 5 and 6 involves the use of each of the pairs of reactor vessels alternately as similar components in the over-all process. For the production of silane, in the first stage of this cycle, for example, the reactor 90, which is physically identical with the reactor 90', is used as an electrolytic cell where, upon electrolysis, direct current is passed through the cathode 94 and the anode 96, such that lithium metal is produced at the cathode 94 and chlorine is produced at the anode 96. The lithium metal rising from the cathode 94 is collected in the collector hood 98 and rises out through the lithium conduit 100 whence it flows into the top of the reactor 102'. Chlorine leaves the electrolytic cell 90 through the vent 104. In this first stage of the process, the salt composition at the initiation of the electrolysis may be in the vicinity of point E on the lithium-chloride-rich side of the phase diagram of FIG. 7.

With the reactor 102' serving as a hydriding chamber, lithium is converted to lithium hydride by reaction with the hydrogen gas bubbled into the melt through the tube 108'. This hydride, as it forms, dissolves in the molten salt in reactor 102'. Reactors 90 and 90' are desirably maintained at a temperature of approximately 390° C. to 430° C. whereas reactors 102 and 102' are desirably maintained at a temperature in excess of this, and, preferably, at a temperature of approximately 450° C. to 600° C. in the body of the melt and approximately 550° C. to 600° C. at the surface of the melt. The temperature differential between these two sets of reactors causes circulation of the salt solutions between each of the pairs of reactors, as for example, between reactors 90 and 102 of FIG. 6 through interconnecting pipes 110 and 114. A temperature of approximately 550° C. to 600° C. is desirable at the surface of the hydriding reactor to facilitate the rapid conversion of the lithium metal to lithium hydride by reaction with hydrogen. Thus, as lithium hydride is formed in the reactor vessel 102', it is caused to circulate in solution to the reactor 90' by thermal convection or other convenient pumping means.

The desired product, $SiH_4$, is formed then in the reactor 90' by reaction of the hydride in solution in the melt with silicon tetrachloride fed into the reactor 90' through the tube 113'. Silane is recovered as a gas through the vent 104'.

As this reaction proceeds in reactor 90', the melt in this reactor and in the reactor 102' becomes increasingly rich in lithium chloride. As the electrolysis proceeds in the reactor 90 during this first stage of the process, the melt in the reactors 90 and 102 becomes increasingly lower in lithium chloride. Because of the stoichiometry of the reaction, the decrease in lithium chloride concentration of the melt in the reactors 90 and 102 will correspond to the increase in concentration in the reactors 90' and 102', assuming they have the same volume. At the initiation of the first stage of the reaction, it is, therefore, desirable to have the composition in the reactors 90' and 102' in the region of point F on the phase diagram of FIG. 7. Thus, as the reaction proceeds in these two separate reactors, the composition in the reactor pair 90 and 102 will start at E and will tend toward F. Correspondingly, the concentration in reactors 90' and 102' will start at F and tend toward E. Thus, it is seen that after carrying out this process for a given time, which will be a function of the total volume of salt in each of these systems, the composition will have been altered so that in reactors 90' and 102', it is substantially that which existed in reactors 90 and 102 at the beginning of this phase of the cycle and in reactors 90 and 102, it is substantially that which was prevalent in reactors 90' and 102' at the beginning of this phase. At this point, the second phase of this cycle is initiated. The roles of the two sets of reactors are exchanged. That is, the reactor 90' is made the electrolysis cell, the reactor 90 becomes the hydrogenation chamber and the reactor 102 becomes the hydriding chamber. The process is then continued in this second phase of the cycle until the compositions in the reactors 90 and 102 once again are approximately that at point E at the LiCl-rich side of the phase diagram, and the compositions in the reactors 90' and 102' are once again that of point F of the phase diagram, at which time the respective roles are again reversed.

The above-described process and apparatus achieve a substantially continuous or semicontinuous process in which the problem of adjusting the rate of flow from the hydrogenation chamber back to the electrolysis cell and from the electrolysis cell into the hydriding chamber is eliminated. The loss in efficiency due to the partial transport of hydride into the electrolytic cell, wherein the hydride would be electrochemically destroyed, is further eliminated. The only criterion impressed on this system is that the rate of flow between the two sets of reactors at each phase is sufficient such that the hydride is transported into the hydrogenating reactor at a rate adequate to maintain the necessary concentration of hydride in the latter reactor to carry out complete hydrogenation of the $SiCl_4$.

As specific examples of both the process of the invention and the use of the several types of apparatus embodying it, the following details of operation are given. Thus, the apparatus shown in FIG. 1 was charged with a mixture of 60 mole percent of lithium chloride, 30 mole percent of potassium chloride and 10 mole percent of lithium hydride. The addition of lithium hydride was made to cause the system to produce silane at the beginning of the electrolysis. After the excess lithium hydride was depleted from the anode area, the unit produced silane with the electrolysis cell operating at 13 amperes and 11 volts.

In another run of the same unit, no external addition of lithium hydride was made. Silane was produced from the charge for five hours at 14 to 15 amperes.

Using the unit shown in FIG. 2, a potassium chloride charge containing equal amounts of lithium chloride and with an initial amount of 5 mole percent of lithium hydride in the circulating volume was added to the unit. Silane was produced in the system at 10 amperes and 5.4 to 6.5 volts at 26 percent current yield.

A number of runs were made with the units shown in FIGS. 3 and 4. In typical runs, silane was, for example, produced for 99 ampere hours at 16 percent current efficiency at 10 to 16 amperes and 13 to 14 volts. In other runs, silane was produced for 36 ampere-hours at 33 percent efficiency at 15 and, again, at 13.8 volts. Similarly, silane was produced for 122 ampere-hours at 26 percent efficiency at 12 to 14 amperes at 14 volts. Again, silane was produced for 50 ampere-hours at 45 percent current efficiency at 14.5 amperes and 14 volts and, again, at 9.5 amperes. Silane was also produced for 55 ampere-hours at 41 percent efficiency at 15 amperes and 14 volts and, again, at 7 amperes. Another run was made in which silane was produced for 67 ampere-hours at 46 percent efficiency at 16 amperes and 14 volts and, again, at 10 amperes.

Silane produced by the present process, without further purification, has yielded p-type silicon of the order of 200 ohm-centimeter upon thermal decomposition in known manner.

It will be understood that in the specific examples just described, particular materials have been used but that such materials are not of themselves critical to the invention. For example, instead of the lithium chloride-potassium chloride melt used, a number of others are suitable. Tabulated below are representative examples.

Rubidium chloride-lithium chloride
Potassium bromide-lithium bromide
Strontium chloride-lithium chloride
Cesium chloride-sodium chloride
Calcium chloride-sodium chloride Lithium bromide-lithium chloride
Rubidium chloride-sodium chloride
Potassium chloride-potassium fluoride
Sodium chloride-sodium fluoride
Calcium chloride-potassium chloride
Strontium chloride-sodium chloride
Barium chloride-potassium chloride
Lithium chloride-sodium chloride-cesium chloride
Lithium chloride-sodium chloride-rubidium chloride
Lithium chloride-potassium chloride-rubidium chloride
Sodium chloride-potassium chloride-calcium chloride The silicon tetrachloride utilized in this system can be derived from any source but is conveniently prepared from the chlorine generated in the electrolysis cell. This affords a stoichiometric balance in the overall system since as indicated in Equation 2 above, the lithium chloride which was converted to lithium and chlorine in the electrolysis cell is regenerated in the molten salt in the silane-forming reaction. The silicon tetrachloride may be formed by reaction of the chlorine with silicon or with silicon dioxide and carbon or by other well known processes.

In the approach described above in connection with certain of the apparatus designs, silicon is used as the active anode and thereby directly produces silicon tetrachloride rather than chlorine as the anode product. Experiments have been carried out which demonstrate that the silicon tetrachloride is actually produced electrochemically rather than by chemical reaction of electrochemically produced chlorine with the silicon in this environment.

As has been indicated above, the invention is applicable to the production of hydrogenated compounds of those elements of Groups III, IV and V of the Periodic Table which form stable hydrides. There elements include boron, aluminum, gallium, carbon, silicon, germanium, tin, lead, phosphorus, arsenic, antimony, bismuth and nitrogen, nitrogen forming, for instance, compounds such as hydrazine and ammonia. The invention is also useful for other hydriding reactions such as conversion of organic chlorosilane to the corresponding organic hydrosilane. Typical hydriding reactions which may be carried out in accordance with the invention are set forth as follows:

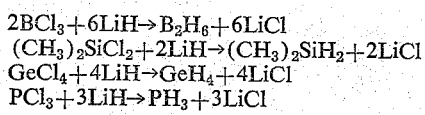

Thus, the invention provides an effective, relatively low cost source of hydride with which a variety of reactions may be performed economically.

A characteristic common to each form of apparatus embodying the invention above described is that each takes advantage of the density differences arising from the temperature difference in the hydriding and hydrogenating chambers to establish a thermal convective circulatory loop by appropriate design of these chambers and their connecting pipes. This feature has proved to be very effective for between the melt between all vessels. The design of the system to incorporate a forced circulation of the hydride-containing salt in an important innovation, as contrasted to the continuous system of other processes where relatively slow diffusion of the hydride in the salt is the mechanism employed to bring the hydride to the zone where it reacts with the halide. Instead of relying solely on thermal convection, conventional pumps may be used at appropriate locations.

It has thus been shown that there has been provided by this invention apparatus by means of which the various objects hereinabove set forth together with many thoroughly practical advantages are successfully achieved. As many possible embodiments may be made of the above invention and since many changes may be made in the embodiments above set forth, it is to be understood that all matter hereinabove set forth or shown in the accompanying drawing is illustrative and not limitative of the invention.

The Periodic Table of the Elements referred to herein is that devised by Mendelyeev found for example on pages 392 and 393 of "The Handbook of Chemistry and Physics," 37th Edition (1955–56), Chemical Rubber Publishing Company.

What is claimed is:

1. A process for the production of hydrogen-containing compounds of those elements of Groups III, IV and V of the Periodic Table which form stable hydrides, which process comprises electrolyzing in an electrolysis zone a non-oxidizing melt containing a halide of a metal selected from the group consisting of the alkali metals and the alkaline earth metals to produce said selected metal in elemental form; transporting the melt containing the metal to a hydriding zone introducing hydrogen into said hydriding zone; maintaining said melt and said metal in said hydriding zone at a temperature sufficient to cause a hydriding reaction to proceed between said metal and hydrogen but below that temperature at which the hydride decomposes, to transform said metal to its corresponding hydride and to form a solution of said hydride in said melt; transporting at least in part by thermal convection the hydride solution so formed from a relatively lower position in the hydriding zone to a relatively higher position in a hydrogenation zone; contacting said solution in said hydrogenation zone with a halogen-containing compound of said element selected from said Groups III, IV and V at a temperature above the freezing point of the melt but below the decomposition temperature of the desired product to form the desired hydrogenated compound of said element, and at a relatively lower temperature than in the hydriding zone.

2. A process as defined by claim 1 wherein said melt is composed of a mixture selected from the following group of mixtures:

Rubidium chloride-lithium chloride
Potassium bromide-lithium bromide
Strontium chloride-lithium chloride
Cesium chloride-sodium chloride
Calcium chloride-sodium chloride
Lithium bromide-lithium chloride
Rubidium chloride-sodium chloride
Potassium chloride-potassium fluoride
Sodium chloride-sodium fluoride
Calcium chloride-potassium chloride
Strontium chloride-sodium chloride
Barium chloride-potassium chloride
Lithium chloride-sodium chloride-cesium chloride
Lithium chloride-sodium chloride-rubidium chloride
Lithium chloride-potassium chloride-rubidium chloride
Sodium chloride-potassium chloride-calcium chloride
Lithium chloride-potassium chloride 3. A process according to claim 1, wherein the halide melt composition is maintained within desirable limits by continuous transport of the by-product metal halides dissolved in said melt from the hydrogenation zone to the electrolysis zone, and by the transport of the metal halide-depleted melt from the electrolysis zone to the hydriding zone wherein said metal halide mixes with the melt from said hydrogenation zone.

4. A process for the production of silane which comprises electrolyzing in an electrolysis zone a non-oxidizing melt containing a halide of a metal selected from the group consisting of the alkali metals and the alkaline earth metals to produce said metal in elemental form; transporting the melt containing the metal to a hydriding zone; reacting said metal with hydrogen while in the presence of said melt to form a hydride of said metal and to cause the hydride so formed to dissolve in said melt; transporting at least in part by thermal convection the hydride solution so formed from a relatively lower position in the hydriding zone to a relatively higher position in a hydrogenation zone; and reacting said solution in said zone at a temperature relatively lower than that of the hydriding zone with silicon tetrachloride to produce silane.

5. A process as defined by claim 4 in which said melt is a eutectic mixture of lithium chloride and potassium chloride.

6. A process as defined by claim 5 wherein said electrolysis zone is maintained at a temperature above the freezing point of said melt but below about 500° C. during electrolysis; said hydriding zone is maintained at a temperature of 450° C. to 625° C. during hydriding; and said hydrogenation zone is maintained at a temperature above the freezing point of said melt but below about 500° C. during hydrogenation.

7. A process as defined by claim 4 in which said silicon tetrachloride is produced at the anode in said electrolysis zone by reacting silicon with chlorine generated during electrolysis of the melt.

8. A process for the production of hydrogen-containing compounds of those elements of Groups III, IV, and V of the Periodic Table which form stable hydrides, which process comprises providing a pair of electrolysis zones associated with a pair of hydriding zones. electrolyzing in one of said electrolysis zones a non-oxidizing melt containing a halide of a metal selected from the group consisting of the alkali metals and the alkaline earth metals to produce said selected metal in elemental form; transporting the melt containing the metal to one of said hydriding zones; passing hydrogen through said melt, at a temperature sufficient to cause a hydriding reaction to proceed at a practical rate but below the decomposition temperature of said hydride, to transform said metal to its corresponding hydride and to form a solution of the hydride so formed in said melt; and transporting at least in part by thermal convection the hydride solution so formed from a relatively lower position in the hydriding zone to a relatively higher position in the other of said electrolysis zones now serving as a hydrogenation zone and therein contacting said solution at a temperature which is lower than that of the hydriding zone but above the freezing point of the melt and below the decomposition temperature of the desired product, with a halogen-containing compound of an element selected from Groups III, IV and V to form the desired hydrogenated compound of said element.

9. A process as defined by claim 8 in which said selected element is silicon, said halogen-containing compound is silicon tetrachloride and the product is silane.

10. A process as defined by claim 9 in which said melt is an eutectic mixture of lithium chloride and potassium chloride.

11. A process as defined by claim 9 in which said silicon tetrachloride is produced at the anode in said electrolysis zone by reacting silicon with chlorine generated during electrolysis of the melt.

12. A process for the production of organic hydrosilanes which comprises electrolyzing in an electrolysis zone a non-oxidizing melt containing a halide of a metal selected from the group consisting of an alkali metal and an alkaline earth metal to produce the metal in elemental form; transporting the melt containing the metal to a hydriding zone; reacting said metal with hydrogen while in the presence of said melt to form a hydride of said metal and to cause the hydride so formed to dissolve in said melt; transporting at least in part by thermal convection the hydride solution so formed from a relatively lower position in the hydriding zone to a relatively higher position in a hydrogenation zone; and reacting said solution in said hydrogenation zone, at a temperature relatively lower than that of the hydriding zone, with an organic chlorosilane to produce the corresponding organic hydrosilane.

References Cited in the file of this patent

UNITED STATES PATENTS

| | | |
|---|---|---|
| 2,596,690 | Hurd | May 13, 1952 |
| 2,867,568 | Cunningham | Jan. 6, 1959 |
| 2,870,071 | Juda et al. | Jan. 20, 1959 |
| 2,900,318 | Andrews | Aug. 18, 1959 |
| 2,904,491 | Moles et al. | Sept. 15, 1959 |
| 2,936,268 | Stern et al. | May 10, 1960 |
| 3,078,218 | Sundermeyer | Feb. 19, 1963 |
| 3,109,709 | Schechter | Nov. 5, 1963 |

FOREIGN PATENTS

| | | |
|---|---|---|
| 1,092,890 | Germany | Nov. 17, 1960 |